2 Sheets--Sheet 1.

JOHN H. WHITNEY.
Improvement in Grain Binders.

No. 125,366. Patented April 2, 1872.

Witnesses:
Phil. T. Dodge
Thomas Taylor Jr.

Inventor:
John H. Whitney
by
Dodge & Munn
Attys

JOHN H. WHITNEY.
Improvement in Grain Binders.
No. 125,366. Patented April 2, 1872.
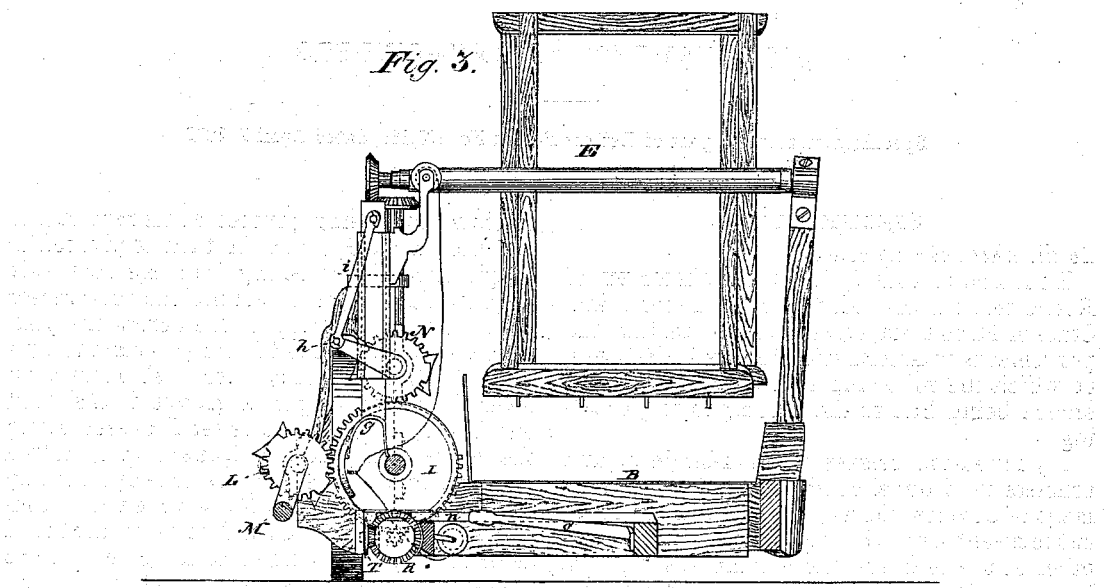
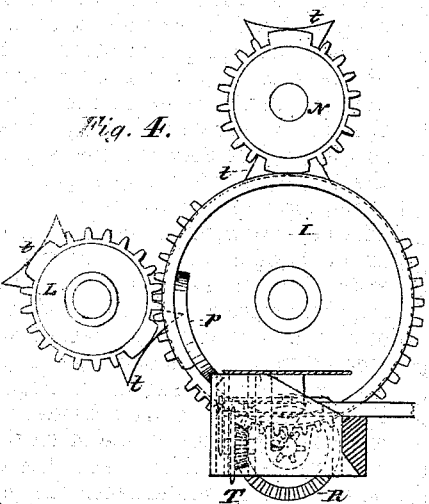
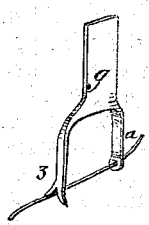
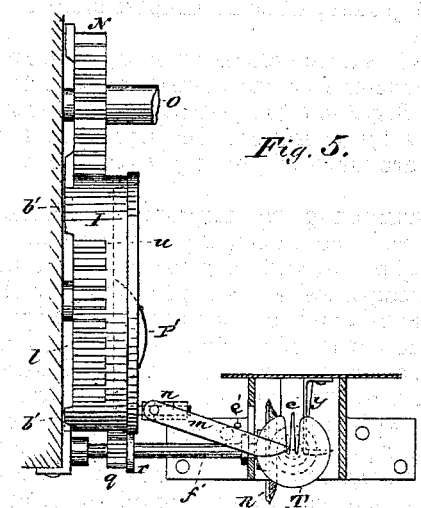
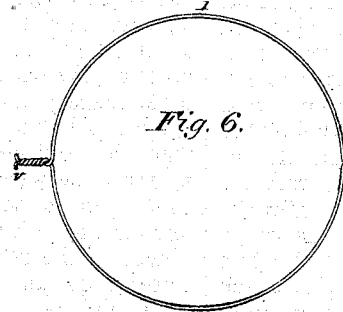
Witnesses:
Phil. T. Dodge
Thomas Taylor Jr.
Inventor:
John H. Whitney
by
Dodge & Munn
Att'ys 125,366

UNITED STATES PATENT OFFICE.

JOHN H. WHITNEY, OF ROCHESTER, MINNESOTA.

IMPROVEMENT IN GRAIN-BINDERS.

Specification forming part of Letters Patent No. 125,366, dated April 2, 1872.

SPECIFICATION.

*To all whom it may concern:*

Be it known that I, JOHN H. WHITNEY, of Rochester, in the county of Olmstead and State of Minnesota, have invented certain Improvements in Automatic Binders for Reapers, of which the following is a specification, reference being had to the accompanying drawing.

My invention relates to grain-binders; and consists in a novel combination and arrangement of devices whereby the grain after being cut is swept from the front platform upon another at the rear and there compressed into a bundle and bound with wire and then dropped upon the ground, all as hereinafter more fully set forth.

Figure 1:
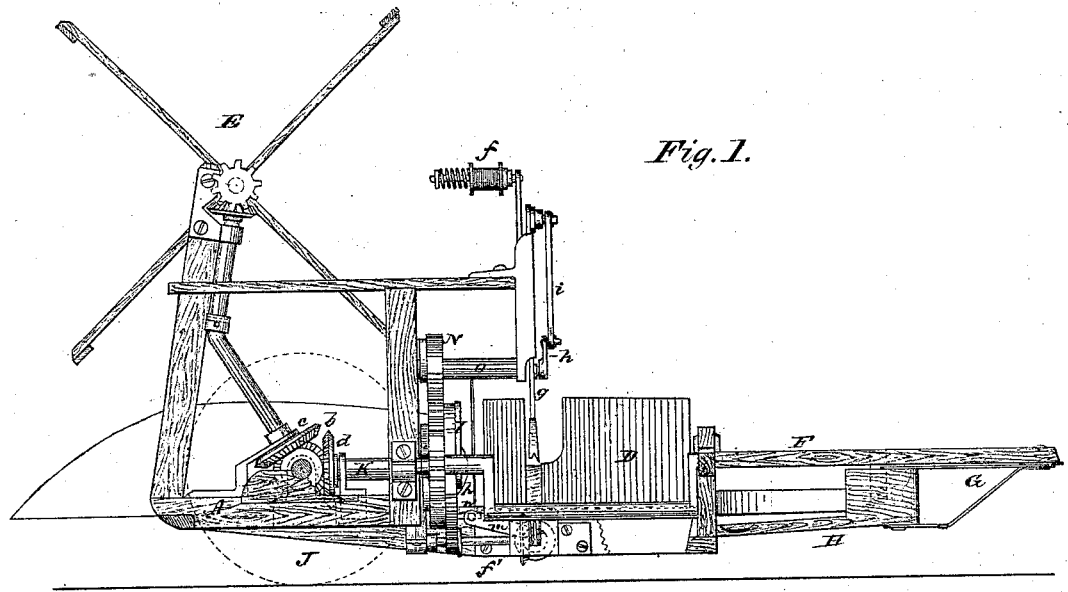
Figure 2:
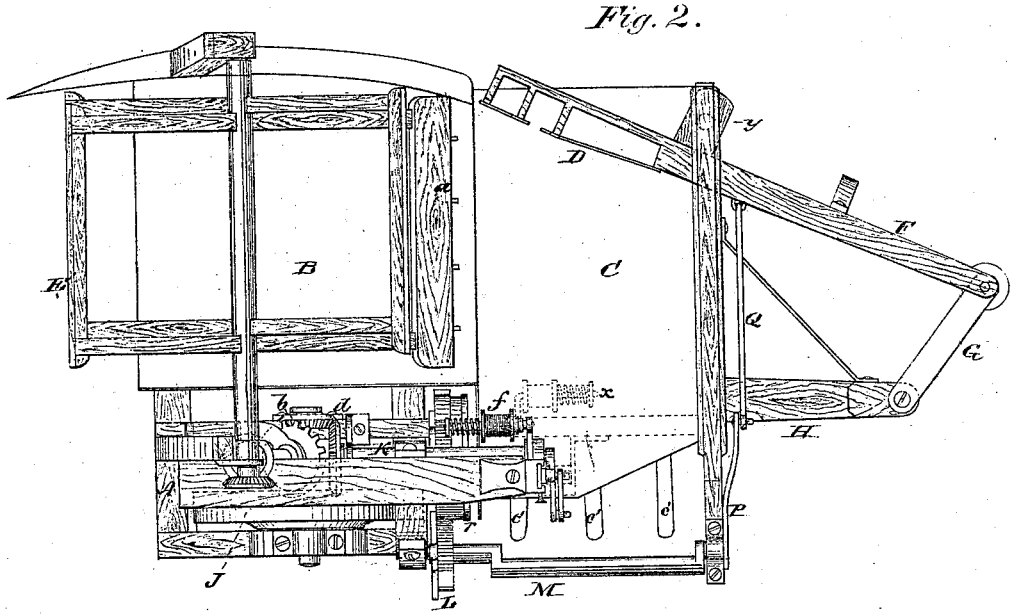

Figure 1 is a side elevation of my improved binding-machine or mechanism applied to a reaper. Fig. 2 is a top-plan view of the same. Fig. 3 is a transverse section; and Figs. 4, 5, 6, and 7 are views of portions shown more in detail.

In constructing my improved machine, I make a suitable frame, A, supported on a driving-wheel, J, with a platform, B, having a supporting-wheel at its opposite side, in the usual manner, and as represented in Figs. 1 and 2, the sickle, of course, being located at the front of the platform, and a reel, E, being mounted above it; the reel having one arm, $a$, provided with teeth to act as a rake, as represented in Fig. 2. This platform B is made to curve from front to rear so that the rake $a$ in its revolutions shall sweep along in close contact with the surface of the platform from front to rear. Immediately in rear of this platform B I locate another one, C, which is flat on its face and extends transversely across the machine at right angles to the front one, and which is also dropped several inches below the rear end of the front platform, so that the instant the rake $a$ has swept the grain from the front platform it shall fall clear of the rake upon the rear one, and thus prevent the grain from being carried on by the rake. On this rear platform I mount a compressor, D, which is arranged to sweep at regular intervals across the platform C, at right angles to the line of the movement of the machine, as shown in Fig. 2; this compressor being mounted on an arm, F, projecting some distance in rear of the machine, and being pivoted at its rear end to a jointed arm, G, which in turn is pivoted to a rigid arm, H, projecting from the rear side of platform C so as to permit the compressor D to move in a straight line across the platform C, it being guided in its movements by a friction-roller, $y$, attached to a short arm on lever F and working in a groove in a slotted bar, through which the lever F passes along the rear edge of platform C, as shown by dotted lines in Fig. 2. This compressor is operated by a crank, P, on a shaft, M, to which it is connected by a pitman, Q, and it is so arranged as to commence its forward movement at the moment the rake $a$ has delivered the grain upon the platform C. The compressor D consists simply of a couple of pieces of sheet metal secured in an upright position to the front side of the arm or lever F by means of cleats or blocks inserted between them and the face of the arm, as shown in Fig. 2; there being a narrow space left between the adjoining ends of the plates, as shown in Figs. 1 and 2, for the wire-carrier $g$ to pass through in its descent. The binding mechanism is located at the front or left hand end of the platform C; and it consists of a twister, T, located in suitable bearings underneath the outer end of the platform and of a forked reciprocating wire guide, $g$, located in suitable bearings or guides above the platform, as shown in Figs. 1, 2, and 3. Two spools of wire are provided; one, $f$, being mounted upon the frame or on the wire-guide $g$ above the platform, and the other one, $x$, being located underneath the platform C, as shown by dotted lines in Fig. 2. The twister T, which is shown in Figs. 4 and 5, consists of a wheel having a row or circle of bevel-teeth on one side with projecting journals on each face; these journals being hollow. It has two slots cut in it, nearly parallel and reaching from the periphery into the center, leaving a finger, $e$, between them, as shown in Fig. 5, so that when the wire from one spool is placed in one slot, and the wire from the other spool is placed in the other slot, with the finger $e$, between them, and the twister is rotated, the two wires will be twisted together, in the manner represented at the right-hand side of Fig. 6, the loop at the center of said right-hand twist representing the position occupied by the finger $e$ while the twist is being performed. For the purpose of guiding the wire from the lower spool $x$ and holding it up clear from stubble, &c., I locate a guide or support, $y$, consisting of a rod bent near its lower end at a right angle on the inner side of the twister and a little to one side of its center, as shown in Fig. 5; the wire from the spool $x$ passing over and being supported by the bent arm of the bar $y$, and passing from thence through the right-hand slot in the twister—this wire when once entered always remaining in the twister, unless accidentally withdrawn, in which case it must be replaced. To guide the upper wire and carry it down over the bundle, I provide a guide or carrier, $g$, which consists of a sliding-bar, mounted in suitable guides above and having its lower end forked, as shown in Fig. 3, and more clearly in Fig. 7, where it is shown detached. Its arms are made of sufficient size to embrace or straddle the twister T, the inner arm $a$ being provided with an eye at its point, through which the wire from the upper spool is passed, and the outer arm $z$ having its end notched or forked, as shown, to strike upon the wire as it descends, and thus carry it down with it. This carrier $g$ is operated at proper intervals by a crank, $h$, on a shaft, $o$, carrying a wheel, N, by which motion is imparted to it, as hereinafter explained. To sever the wire after the bundle is bound, I provide a knife or blade, $m$, which is located close alongside and in front of the twister T, as shown in Fig. 5. This knife has its lower and cutting-edge rounded near its point, and is pivoted at its opposite end to a sliding lever, $n$, which is forced forward by a cam, P′, on the face of the wheel I; the knife $m$ being held down by a pin, $e'$, against which its upper edge or back bears, thus forcing its rounded edge against the wire while the latter is held securely in the twister, and thereby severing the twisted wire close alongside of the twister T, at the point indicated by the dotted lines in Fig. 6, thus releasing the bundle, which is held outside of the twister at the end of the platform C, and leaving the two wires 1 and 2 still united by that portion of the twist which is on the inner side of the twister or of finger $e$, and which is designated by the letter $v$ in said Fig. 6. The lever $n$, to which the knife $m$ is connected, is pivoted at its opposite end to the frame under the platform, as shown in Fig. 3, and is held back by a spring, $o'$, except when forced forward by the cam P′ on the side of wheel I.

These constitute the devices used in my binding apparatus; and it only remains now to describe the means which I employ to impart to them the requisite movements. As will be at once seen, these various devices must necessarily move at certain intervals, and some must remain stationary while others move, and vice versa.

To accomplish these results with the least possible amount of mechanism I have devised and use a novel and peculiar style of gearing, as shown more clearly in Figs. 4 and 5. In making stop-wheels heretofore it has been customary to form them with teeth on a part of their periphery only and to leave the other portion without teeth, so that they would operate on other wheels or be operated on during a portion of their revolution only. With wheels thus constructed there is always a possibility that they may be moved after they have ceased to gear with the other wheel, and a corresponding uncertainty that they will be in the exact position to gear again at the required instant, and more especially so if the driving-wheel is also provided with separate clusters of teeth, as is fequently necessary. To remedy these difficulties I make the driving-wheel I with clusters of teeth at proper intervals on its periphery, and also with a laterally-projecting flange, $b'$, on that part of its face where there are no teeth, as shown in Fig. 5. I then construct the stop-wheels L and N with teeth around their entire face, or with a few of them left uncut at the point where it is to cease motion, and on the sides of these wheels I place one or more plates, $t$, as shown in Fig. 4. These plates or stops have their outer edges cut out on a curve corresponding with the curvature of the periphery of the driving-wheel, which in this case is the wheel I. These wheels are so located in relation to each other as to bring their teeth in the same plane, while the stops $t$ will bear upon the projecting flanges $b'$ until said flanges shall have passed from under the stops, when the latter, as the teeth on the wheels engage, will turn into the spaces $l$ between the laterally-projecting flanges $b'$, thereby permitting the wheels L and N to rotate again until the flange $b'$ is brought around against the stop $t$ again, the stop then bearing on the flange $b'$, and thus holding the wheels L or N securely in position ready to engage again with the teeth of the driving-wheel at the precise time required.

It will be understood that the wheels may be made of any proportionate diameter, and that there may be any number of stops used on a single wheel, so there be sufficient movement to move the stop to the proper position to be out of the way of the end of the flange $b'$ as it comes around and into the proper position to bear against or upon the face of said flange. In this case the wheels L and N have each two stops, and the wheel I, which is of double their diameter, is provided with two sets of teeth placed at opposite sides, with two flanges, $b'$, occupying the intervening spaces. By this arrangement, at each revolution of the wheel I the pinions L and N will be made to operate as follows: First, they will make a half revolution, then remain stationary an equal length of time; then make another half revolution, and then remain stationary another equal length of time; thus imparting to the devices to which they are connected corresponding intermittent movements.

To impart motion to these various wheels and their operating devices I mount upon the inner end of the axle of the driving and bearing wheel J a bevel-gear or pinion, b, (see Fig. 2,) which engages with a corresponding bevel-pinion, d, on a shaft, K, on the rear end of which is secured the driving-wheel I. Above this wheel I is located the stop-wheel N, secured to a shaft, O, upon the rear end of which is the crank h that operates the wire-carrier g. At the outer side of the wheel I I locate the other stop-wheel, L, which is secured to the bent shaft M, which has at its rear end a crank, P, which operates the compresser D. Below the wheel I I locate another and smaller stop-wheel, q, which has a single stop, r, this wheel q engaging with still another set of teeth on wheel I, the teeth and flange on I, which operate in connection with wheel q, being so arranged as to impart to wheel q four revolutions, and then let it remain stationary during the balance of the revolution of wheel I. This stop-wheel q is secured to a shaft, f', (see Figs. 1 and 5,) on the opposite end of which is secured a bevel-pinion, R, which engages with the bevel-teeth on the twister T, and thereby imparts motion to the latter. By this method of constructing and arranging the gearing I am enabled to produce all the required movements of the various parts, and at the required intervals of time, by a very few wheels, thus avoiding the complication so usual and so very objectionable in this class of machines. The reel and rake E is represented as driven by a bevel-pinion, c, Fig. 1, also gearing into the pinion b on the axle; but it may, if preferred, be driven by a chain and sprocket-wheels, or by belt and pulleys suitably arranged.

The operation is as follows: The machine being put in motion, the grain is cut and falls upon the front platform, from whence it is swept by the rake a back onto the platform C. At the instant the rake has thus delivered the grain the compressor D moves and sweeps the grain across the platform C, gathering it up into a bundle and pressing it against the two united wires which pass from the twister T up to the eye of the arm a' of the wire-carrier g, which at that time will be held in its most elevated position by the stop-wheel N. As the compressor advances it presses the bundle tightly against the wire, which is then drawn from the two spools sufficiently to permit the bundle to be shoved entirely off the end of the platform C and be compressed snugly between the compressor and the bent shaft M, the bundle being supported upon the arms c, which project from the end of the platform at some distance below its face, as shown in Fig. 2. While the bundle is held in this position the shaft M remains stationary and the wire-carrier g descends, carrying the upper wire down into the left-hand slot of the twister, the lower wire being already in the other slot, and then the twister revolves and makes the twist, thus binding the bundle, Fig. 6 representing the wire as it is at the instant the twist is completed. The cam P' then forces the knife m forward and cuts the wire at the center of the twist, as indicated by the dotted lines in Fig. 6; and the instant this is done the bent shaft M commences to move, and as its bent portion comes uppermost the bundle is freed and falls upon the ground. The twisted ends v of the two wires remain united, and as the carrier g ascends it pulls the twist up out of the twister a short distance, leaving it just about even with or a little above the edge of the platform, so as to be at the center of one side of the next bundle. In this way it will be seen that each band is composed of two pieces of wire, united by being twisted together at opposite sides of the bundle, and that each time the binding is completed the wires are also united for the next operation.

Having thus fully described my invention, what I claim is—

1. The bent shaft M, constructed and arranged as described, whereby it is made to serve the twofold purpose of operating as one arm of a compressor, and at the same time imparting motion to the other arm, substantially as described.

2. The combination of the bent shaft M with its crank P and the compressor D with the pitman Q, all constructed and arranged to operate substantially as set forth.

3. The combination of the curved platform B, rake E, depressed platform C, and the vibrating compressor D, all constructed and arranged to operate substantially as described.

4. The rotating twister T, having the two slots for the reception of the wires, with the finger e between them, substantially as set forth.

5. The operating mechanism, consisting of the wheel I and the stop-wheels N L and q, all combined and arranged to operate as herein described.

JOHN H. WHITNEY.

Witnesses:
W. C. DODGE,
H. B. MUNN.